(12) United States Patent
Runyan

(10) Patent No.: US 12,429,315 B1
(45) Date of Patent: Sep. 30, 2025

(54) FIREARM TARGET FRAME

(71) Applicant: Donald Runyan, Hillsboro, IA (US)

(72) Inventor: Donald Runyan, Hillsboro, IA (US)

( * ) Notice: Subject to any disclaimer, the term of this patent is extended or adjusted under 35 U.S.C. 154(b) by 0 days.

(21) Appl. No.: 18/892,787

(22) Filed: Sep. 23, 2024

(51) Int. Cl.
*F41J 1/10* (2006.01)
*B23K 31/02* (2006.01)

(52) U.S. Cl.
CPC .................. *F41J 1/10* (2013.01); *B23K 31/02* (2013.01)

(58) Field of Classification Search
CPC ..................................... F41J 1/10; B23K 31/02
See application file for complete search history.

(56) References Cited

U.S. PATENT DOCUMENTS

| | | | |
|---|---|---|---|
| 4,041,630 A | 8/1977 | Holbrook | |
| 5,713,146 A | 2/1998 | Reeves, Sr. | |
| 6,398,215 B1* | 6/2002 | Carroll | F41J 1/10 473/439 |
| 9,644,924 B2* | 5/2017 | Doria | F41J 1/10 |
| 2006/0284035 A1 | 12/2006 | Crosby | |
| 2015/0330748 A1* | 11/2015 | Anzalone | F41J 1/10 273/390 |
| 2016/0238351 A1* | 8/2016 | Doria | F41J 1/10 |
| 2021/0190462 A1* | 6/2021 | Ho | F41J 5/02 |
| 2021/0400823 A1 | 12/2021 | Uebelacker | |

FOREIGN PATENT DOCUMENTS

| | | | |
|---|---|---|---|
| CN | 218211006 U | * 1/2023 | |
| CN | 220708224 U | * 4/2024 | |
| WO | WO-9015964 A1 | * 12/1990 | ............. F41J 3/0004 |

OTHER PUBLICATIONS

Battenfeld Technologies: Targets, Handbook [online], Battenfeld Technologies, Inc., 2013. Retrieved from the Internet: <URL:https://www.btibrands.com/wp-content/uploads/2014/05/2013-Battenfeld-Catalog-96dpi.pdf>, 9 pages.

* cited by examiner

*Primary Examiner* — Jeffrey S Vanderveen
(74) *Attorney, Agent, or Firm* — McKee, Voorhees & Sease, PLC

(57) ABSTRACT

The frame is comprised of two grooved vertical sides, a grooved horizontal bottom, and a slotted horizontal top that allows a rectangularly shaped target to be easily dropped into place through the slotted top and into the grooved sides and bottom. Any target used in the frame may be preprinted or attached to a supporting backing such as cardboard. The target frame may be of any size. The target frame's side and bottom grooves may be of any width and depth to securely hold the target. The target frame's slotted top will be the same width as the target frame's sides and bottom grooves. The target frame may be constructed of any material such as wood, steel or plastic. The target frame may be attached using any method such as with legs or hanging.

17 Claims, 8 Drawing Sheets

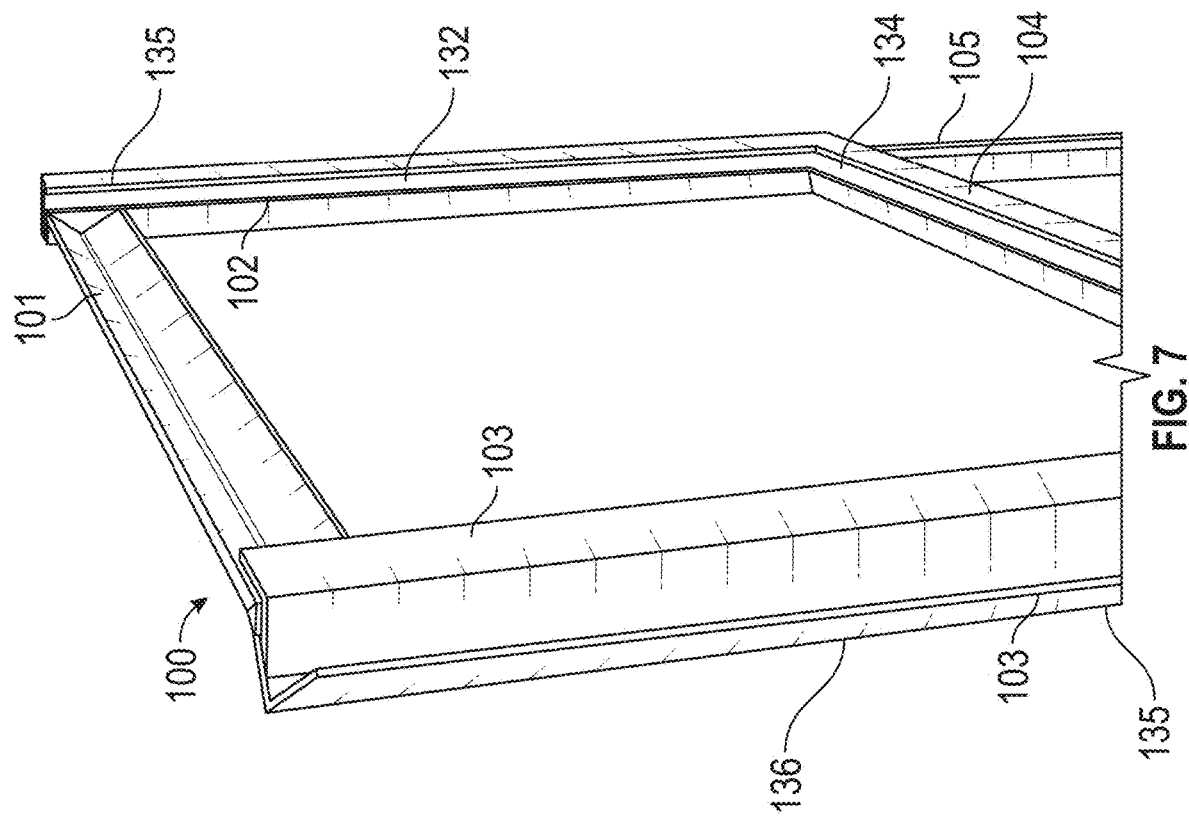
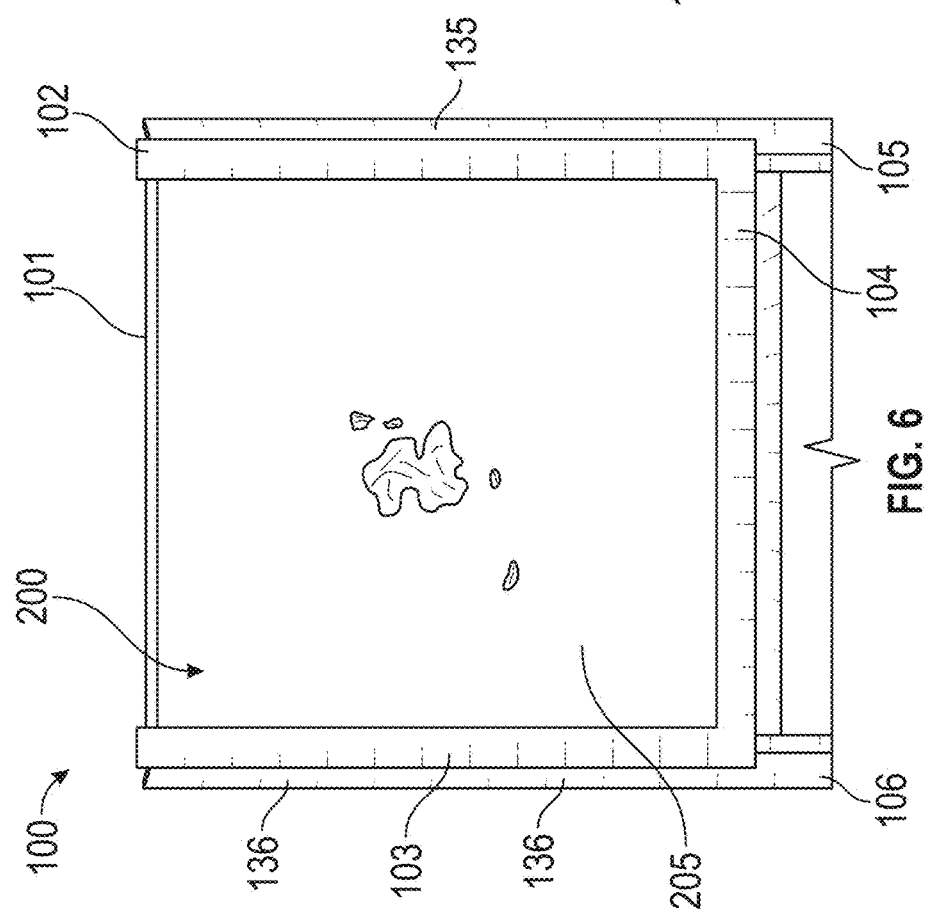

FIREARM TARGET FRAME

TECHNICAL FIELD

The present disclosure relates generally to a firearm target frame and corresponding methods of use and assembly having applications in at least the firearms, sporting, hunting, and games industries. More particularly, but not exclusively, the present disclosure relates to a firearm target frame that allows for the quick, easy, and secure replacement of planar targets.

BACKGROUND

The background description provided herein gives context for the present disclosure. Work of the presently named inventors, as well as aspects of the description that may not otherwise qualify as prior art at the time of filing, are neither expressly nor impliedly admitted as prior art.

The biggest problems with both indoor and outdoor range target changes are the attachment methods used and the time it takes to securely attach and replace targets using staples, tape, clips and other methods.

Many target frames known in the art suffer from a need to establish a compression force that established a friction fit. One such target frame comprises a coroplast board 90 and a portable range steel target stand 91, as shown in FIG. 1. A compressive force establishes a friction fit 92 between coroplast board 90 and the portable range steel target stand 91 to secure the target 93 in place during shooting. Stakes 94 secure the portable range steel target stand 91 to the ground.

Thus, there exists a need in the art for an apparatus which quickly, easily and securely accommodates target changes so that shooters can get back to practicing.

SUMMARY

The following objects, features, advantages, aspects, and/or embodiments are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present disclosure to improve on or overcome the deficiencies in the art.

It is a further object, feature, and/or advantage of the present disclosure to quickly, easily and securely accommodate target changes so that shooters can get back to practicing.

It is preferred the apparatus be safe, cost effective, and durable. For example, the firearm target frame can be adapted to resist excessive heat, static buildup, corrosion, and/or mechanical failures (e.g. cracking, crumbling, shearing, creeping) due to excessive impacts and/or prolonged exposure to tensile and/or compressive forces acting on the firearm target frame.

At least one embodiment disclosed herein comprises a distinct aesthetic appearance. Ornamental aspects included in such an embodiment can help capture a marksman's attention and/or identify a source of origin of a product being sold. Said ornamental aspects will not impede functionality of firearm target frame.

Methods can be practiced which facilitate use, manufacture, assembly, maintenance, and repair of target frame which accomplish some or all of the previously stated objectives. For example, the target frame is ideally constructed from materials that can be repaired with common woodworking, plastic working, or welding tools found within the average home.

The target frame can be incorporated into systems or kits which accomplish some or all of the previously stated objectives. For example, the target frame can be included in a training system that mounts the targets in rails so that the target can be moved within one dimension, on wheels so that the target can be moved in two dimensions, or attached to a drone so that the target can be moved within three dimensions.

According to some aspects of the present disclosure, a frame for a target comprises vertically oriented side members, each of the vertically oriented side members having a groove on an internal side of the vertically oriented side members, wherein the grooves oppose each other; a horizontally oriented bottom member; and a horizontally oriented top member comprising a slot therethrough, wherein the slot allows the target to be dropped into the grooved slides until the target rests on top of the horizontally oriented bottom member. Each of the vertically oriented side members, the horizontally oriented bottom member, and the horizontally oriented top member taper rearwardly and away from a central ridge so that projectiles ricochet downstream from a location at which the projectiles are released. The mechanism (e.g., grooves) for holding the target in place is free from a compression force that establishes a frictional fit.

According to some additional aspects of the present disclosure, the horizontally oriented bottom member includes a groove in a top surface thereof.

According to some additional aspects of the present disclosure, the target comprises paper, paperboard, or cardboard.

According to some additional aspects of the present disclosure, the frame is free from fasteners that can establish direct attachment of the target to said frame.

According to some additional aspects of the present disclosure, the frame is free from locking mechanisms that are needed to keep the target in place while the target is being shot.

According to some additional aspects of the present disclosure, the frame hangs from a ceiling.

According to some additional aspects of the present disclosure, the frame is bolted to the ground.

According to some additional aspects of the present disclosure, the frame comprises aluminum, steel, wood, or plastic.

According to some additional aspects of the present disclosure, the vertically oriented side members are welded to the horizontally oriented bottom member and the horizontally oriented top member.

According to some additional aspects of the present disclosure, the frame further comprises legs that extend downwardly from each end of the horizontally oriented bottom member. A cross-brace can be welded to each of the legs so that the legs maintain a constant distance from one another from the top of the legs to the bottom of the legs.

According to some additional aspects of the present disclosure, an angle of the taper is 30°, between 30° and 60°, or 60°.

According to some additional aspects of the present disclosure, a hollow cavity is located behind the central ridge.

According to some additional aspects of the present disclosure, each of the vertically oriented side members are given 45° cuts at a top end. Additionally, the horizontally oriented top member and the horizontally oriented bottom member can each be given two 45° cuts at each end. Even further, the 45° cuts at the top end of the vertically oriented side members can be welded to the 45° cuts at each end of the horizontally oriented top member and the horizontally oriented bottom member.

According to some other aspects of the present disclosure, a kit comprises vertically oriented side members, each of the vertically oriented side members having a groove on an internal side of the vertically oriented side members, wherein the vertically oriented side members each comprise sloped surfaces that are joined at a central ridge; a horizontally oriented bottom member, wherein the horizontally oriented bottom member comprises sloped surfaces that are joined at a central ridge; and a horizontally oriented top member comprising a slot therethrough, wherein the slot allows a target to be dropped therethrough, wherein the horizontally oriented top member comprises sloped surfaces that are joined at a central ridge. The kit does not contain any fasteners for establishing direct attachment of the target to any one or more of the vertically oriented side members, the horizontally oriented bottom member, and the horizontally oriented top member.

According to some other aspects of the present disclosure, a method of assembling a gun target frame comprises welding a top member to a first leg; welding the top member to second leg; welding a support member to the first leg; welding a support member to the second leg; welding a first side member to a bottom member; welding a second side member to the bottom member; assembling back pieces into slots; a welding the first side member to the back piece; welding the second side member to the back piece; welding the bottom member to the first side member; welding the bottom member to the second side member; and welding the back piece to the bottom member.

These and/or other objects, features, advantages, aspects, and/or embodiments will become apparent to those skilled in the art after reviewing the following brief and detailed descriptions of the drawings. The present disclosure encompasses (a) combinations of disclosed aspects and/or embodiments and/or (b) reasonable modifications not shown or described.

BRIEF DESCRIPTION OF THE DRAWINGS

Several embodiments in which the present disclosure can be practiced are illustrated and described in detail, wherein like reference characters represent like components throughout the several views. The drawings are presented for exemplary purposes and may not be to scale unless otherwise indicated.

FIG. 6 shows a back elevation view of the firearm target frame of FIG. 2, according to some aspects of the present disclosure.

FIG. 7 shows another back perspective view of the firearm target frame of FIG. 2, emphasizing view of the first vertical internal groove, second vertical internal groove, and optional horizontal internal groove, according to some aspects of the present disclosure.

An artisan of ordinary skill in the art need not view, within isolated figure(s), the near infinite distinct combinations of features described in the following detailed description to facilitate an understanding of the present disclosure.

DETAILED DESCRIPTION

The present disclosure is not to be limited to that described herein. Mechanical, electrical, chemical, procedural, and/or other changes can be made without departing from the spirit and scope of the present disclosure. No features shown or described are essential to permit basic operation of the present disclosure unless otherwise indicated.

Figure 1:
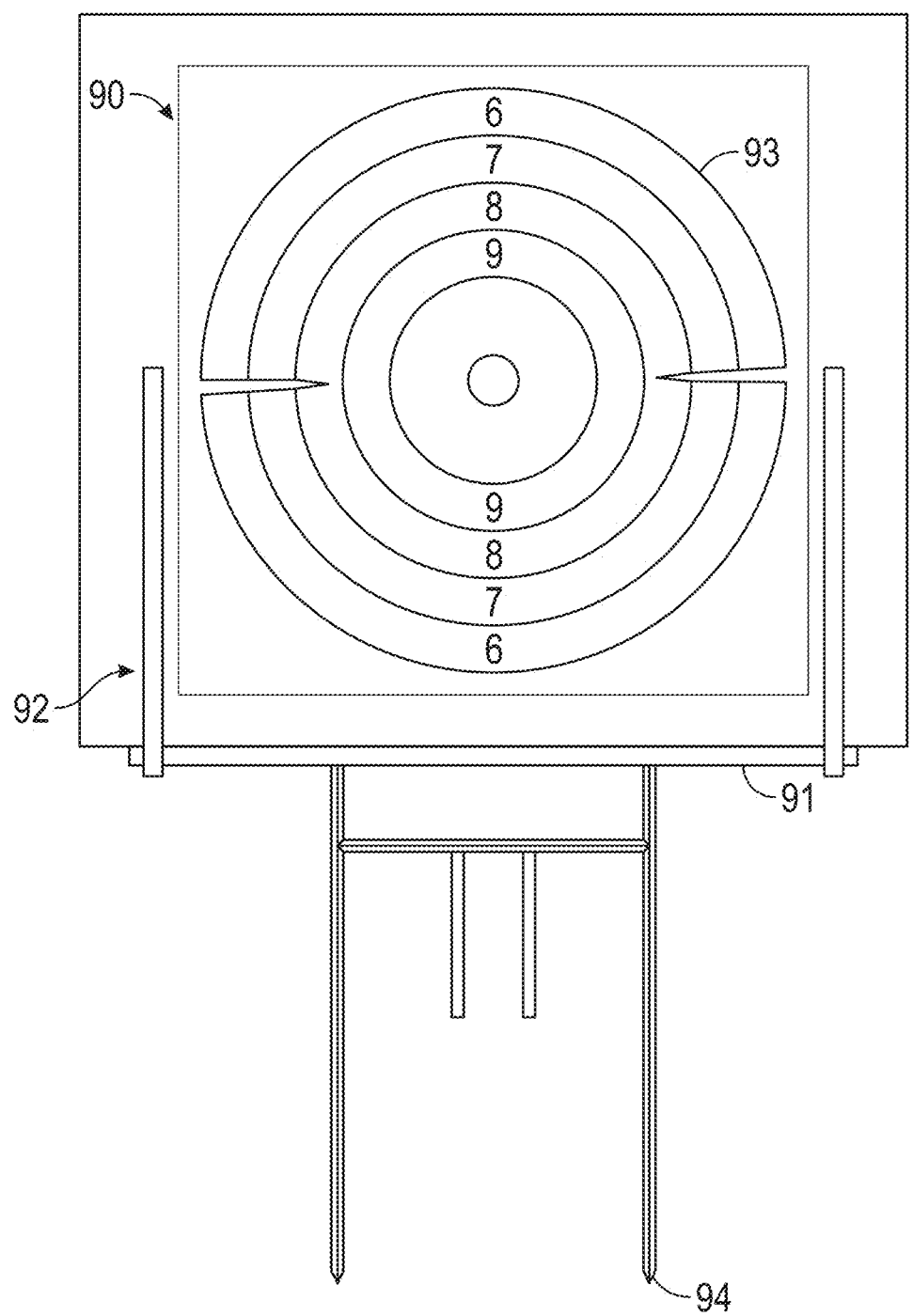
FIG. 1 shows a traditional firearm target frame, which relies on a compression fit between flexible arms and an additional member(s), such as a backboard, to keep the target secure during shooting.
Figure 2:
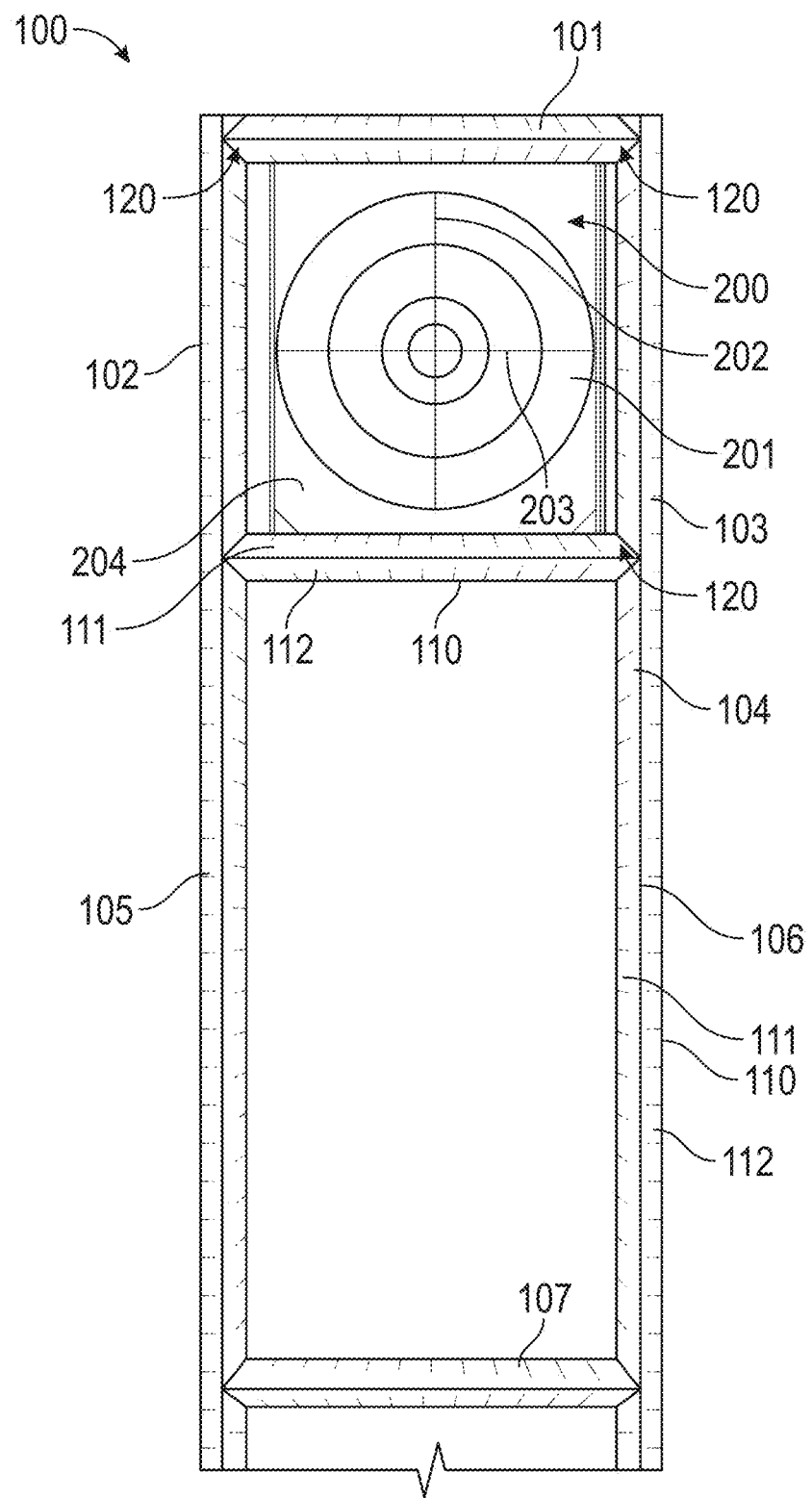
FIG. 2 shows an improved firearm target frame, according to some aspects of the present disclosure.

As shown in FIG. 2, an improved firearm target frame 100 can include a horizontally oriented top member 101, vertically oriented side members 102, 103, and a horizontally oriented bottom member 104.

Optionally, the firearm target frame 100 can include legs 105, 106 that extend downwardly from each end of the horizontal bottom member 104. Further, the legs 105, 106 can optionally be bolted and/or mounted to the ground. Even further, additional optional support members 107 and/or cross-braces 108 that can be used to help secure the legs 105, 106 to one another at locations away from the grooved and slotted portion of the firearm target frame 100.

Alternatively, in the event the firearm target frame 100 does not include legs, the firearm target frame 100 can hang from the ceiling or another object located at a higher elevation than the ground.

According to some aspects of the present disclosure, the firearm target frame 100 can be used in front of a backstop, e.g., a 15' high earthen pond dam. A ground target frame 100 in particular would allow gun ranges, school shooting teams, individuals and others to use sand bags or earth at a very reduced backstop height.

Each of the vertically oriented side members 102, 103, the horizontally oriented bottom member 104, and the horizontally oriented top member 101 have two sloped surfaces 111, 112 that taper rearwardly and away from a central ridge 110 so that projectiles ricochet downstream from a location at which the projectiles are released. The angle of the taper is preferably between 30° and 60° (inclusive of 30° and 60°). The angle of the taper is more preferably between 40° and 50° (inclusive of 40° and 50°). The angle of the taper is most preferably approximately 45°.

The firearm target frame 100 can be of any size, but preferably is sized so as to hold shooting target(s) 200 of common sizes. The firearm target frame side and bottom grooves 132, 133, 134 are sized to securely hold the target. The top slot 131 can be sized bigger to easily allow a shooting target 200 to move therethrough.

Components of the firearm target frame 100 can be constructed from aluminum, steel, angle iron, round tubing, square tubing, or any other suitable metals, and can be formed from production processes known to a metal tool and die maker. According to some aspects of the present disclosure, aluminum is the preferred metal due to its lighter weight and reduced metal cleaning time prior to welding or painting if required.

The shooting target 200 can comprise, but is not limited to comprising, a plurality of regions assigned a plurality of numeric point values 201, preferably used in sporting competitions; depictions of objects intended to be shot (e.g., a bullseye 202 at the center); visual markers 203 such as cross-hairs and/or concentric rings; depictions of objects 204 that should not be shot (e.g. regions worth no points, depictions of objects that would be considered friendly fire); or a combination thereof. As an example, depictions of objects intended to be shot 202 can include animals in a hunting situation. Third parties even sell 2D targets that resemble silhouettes of chickens, pig, turkeys, rams, and the like. If sized correctly, the targets 200 need not be rectangular to fit into the firearm target frame 100, so long as there are at least some points of contact where necessary to establish the proper function.

The shooting target 200 is preferably a paper planar target that is typically used for pistol, rifle, shotgun and other shooting sports. In lieu of paper, self-healing rubber, steel, foam, and frangible objects can be used for shooting targets 200. It should also be appreciated that the planar target described herein can be used with regard to other sports and games. Said other sports and games could include darts, target archery, crossbow shooting, or other non-firearm related sports.

The shooting target 200 is preferably entirely non-reactive or substantially non-reactive. For example, with respect to a paper target, an ordinary disposable paper-based target can be made be made from paperboard/cardboard, corrugated board or even fiberboard. Optionally, the target comprises a minimally reactive material, such as a dual color material that flakes off when struck by a projectile. One such suitable example of a shooting target is sold by Caldwell® under the Orange Peel® brand. The shooting targets 200 are ideally mass-produced with little expense, which complements the ease of replacement established by the unique aspects of the frame described herein. The shooting target 200 is preferably a single use target.

Preferably, the shooting target 200 is free from electronic devices. While electronic targets that electronically can provide the shooter with precise feedback of the shot placement, the benefits provided by such feedback are often outweighed by the costs. Similarly, reactive targets can produce a visible or audible response when hit, usually by generating a sharp sound or by moving and/or bouncing along the ground, however the benefits of using such reactive targets are similarly outweighed by the costs.

Preferably, the shooting target is also free from the use of adhesives.

Figure 3:
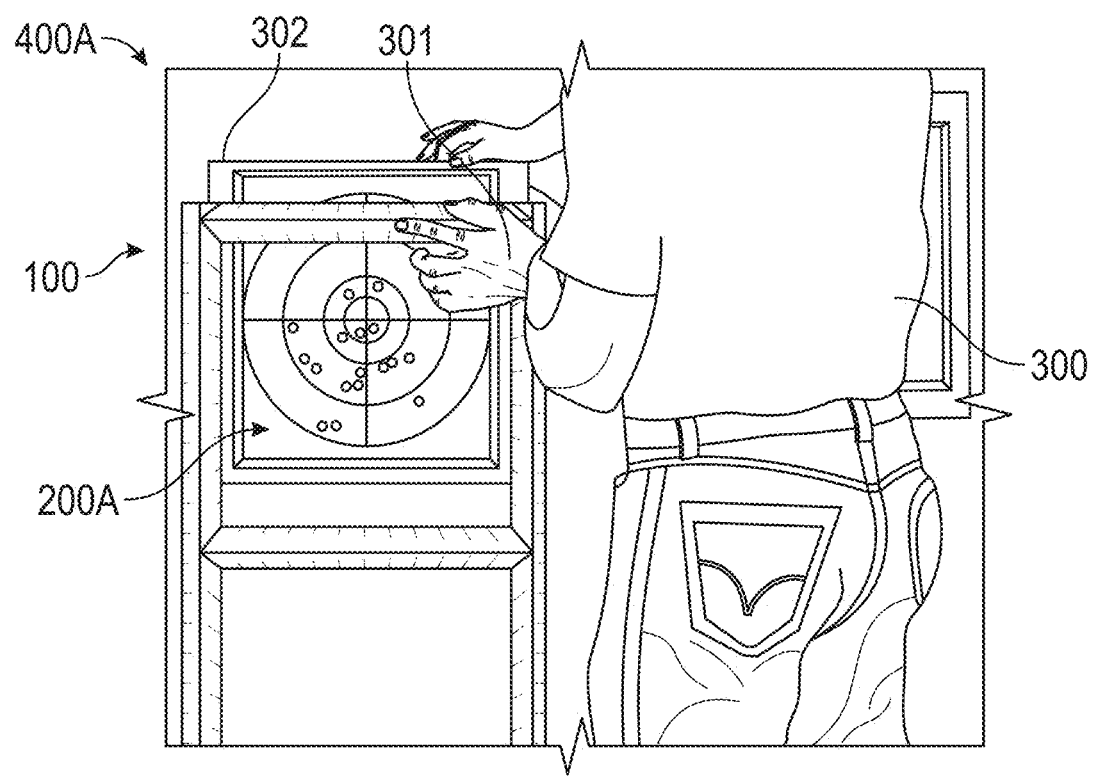
FIG. 3 shows an operator replacing a used shooting target by sliding the used shooting target up and out of a slot in the top horizontally oriented member of the firearm target frame of FIG. 2, according to some aspects of the present disclosure.
Figure 4:
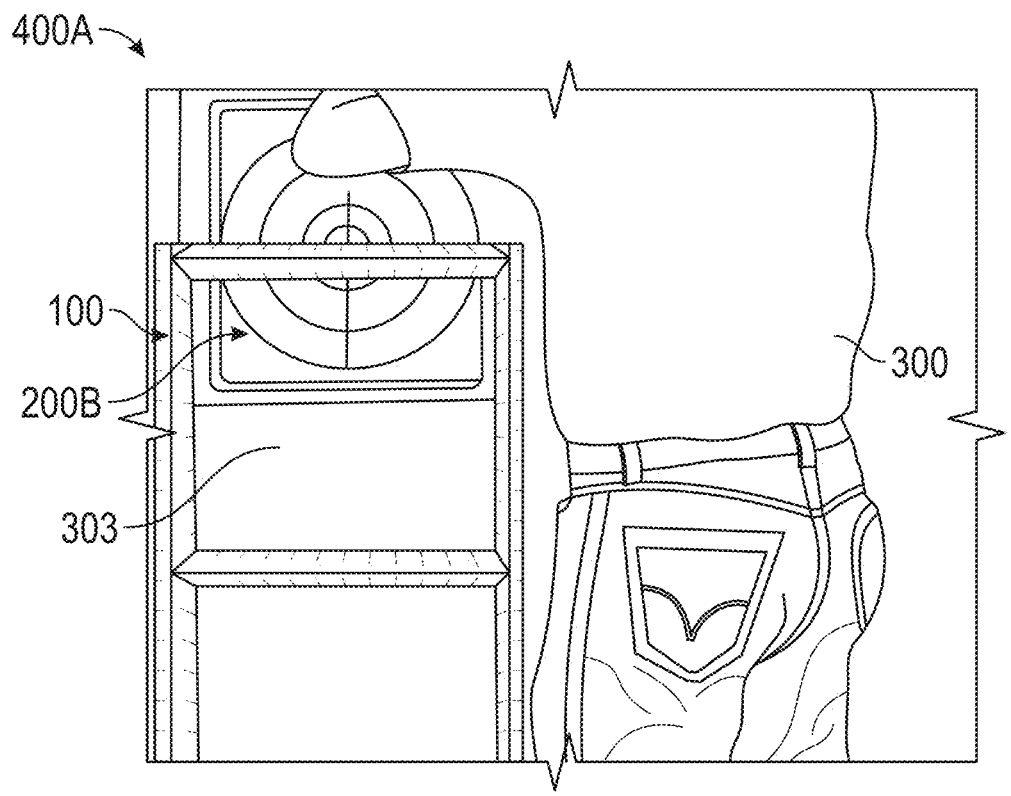
FIG. 4 shows an operator replacing a used shooting target by dropping a new shooting target through the slot in the top horizontally oriented member so that it travels downward along the internal grooves of the vertical side members of the firearm target frame of FIG. 2, according to some aspects of the present disclosure.

FIGS. 3-4 show a marksman 300 replacing a used target 200A with a new target 200B, for use in the assembled system for shooting & target practice 400A.

In FIG. 3, the used target 200A has previously been struck with projectiles, and the dual color material that made up the target 200 has already flaked off. As shown in FIG. 3, the marksman 300 uses a hand 301 to deliver a push force 302 up and slide the used target 200A along internal grooves 132, 133 until the used target 200A completely passes through the slot 131 and can be removed from the firearm target frame 100.

In FIG. 4, the new target 200B has not yet been struck with projectiles, and a first color of the dual color material that makes up the target 200 has not yet flaked off. As shown in FIG. 4, the marksman 300 uses a gravitational force 303 to drop the new target 200B through the slot 131 along internal grooves 132, 133 until the used target 200A rests on top of the bottom member 104 or in an optional horizontal internal groove 134.

While forces other than push/pull forces applied by the human hand can create similar results to forces 302, 303, it is to be appreciated that these forces are the quickest, simplest, and most cost-effective ways to quickly and easily replace targets in the improved firearm target frame 100 described herein.

The marksman 300 is a person who practices precision shooting and is familiar with projectile weapons. The marksman can use projectile weapons such as an accurized scoped long gun such as designated marksman rifle to shoot at said targets 200, 200A, 200B at long distances.

Figure 5:
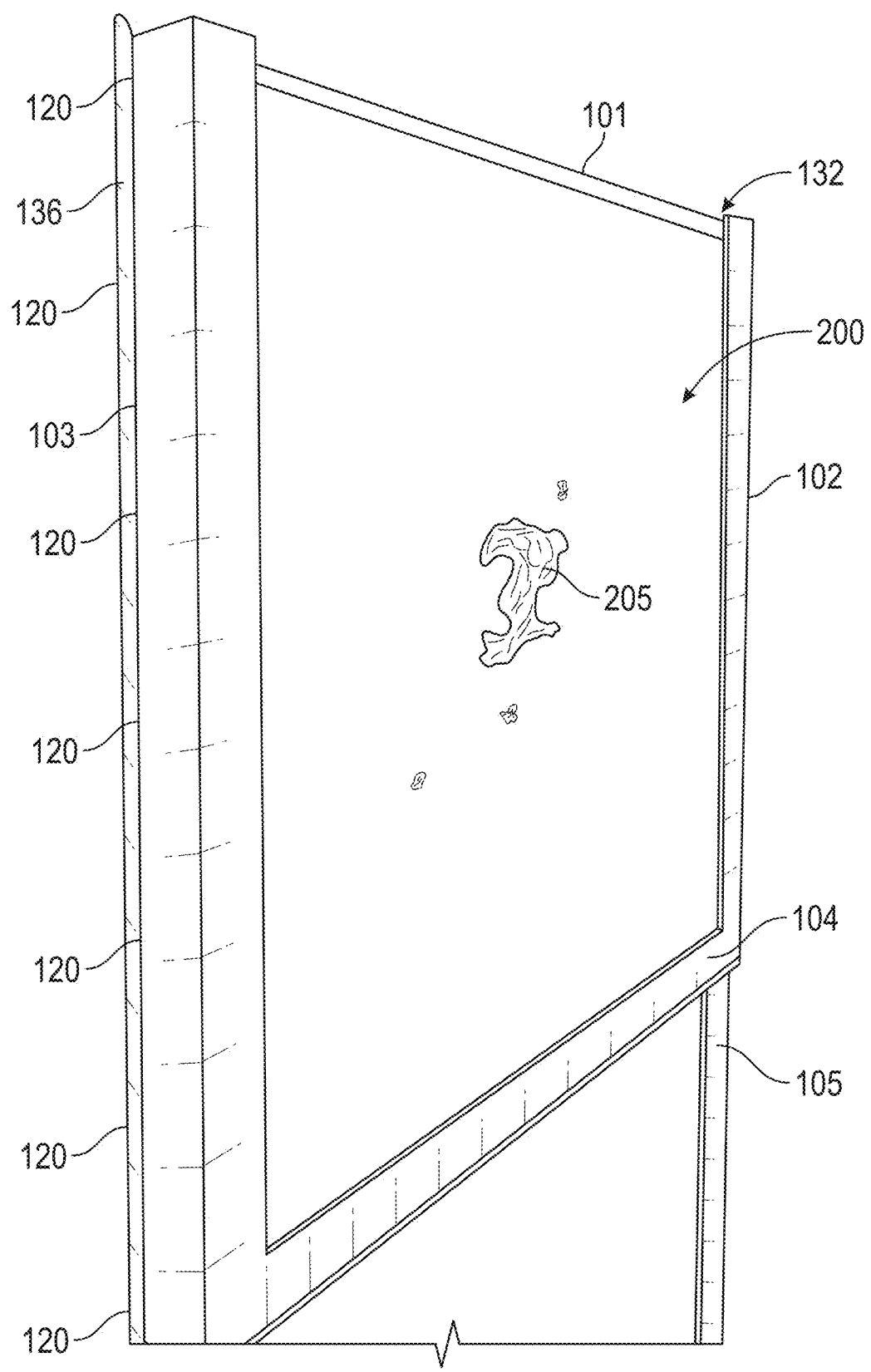
FIG. 5 shows a back perspective view of the firearm target frame of FIG. 2, according to some aspects of the present disclosure.
Figure 8:
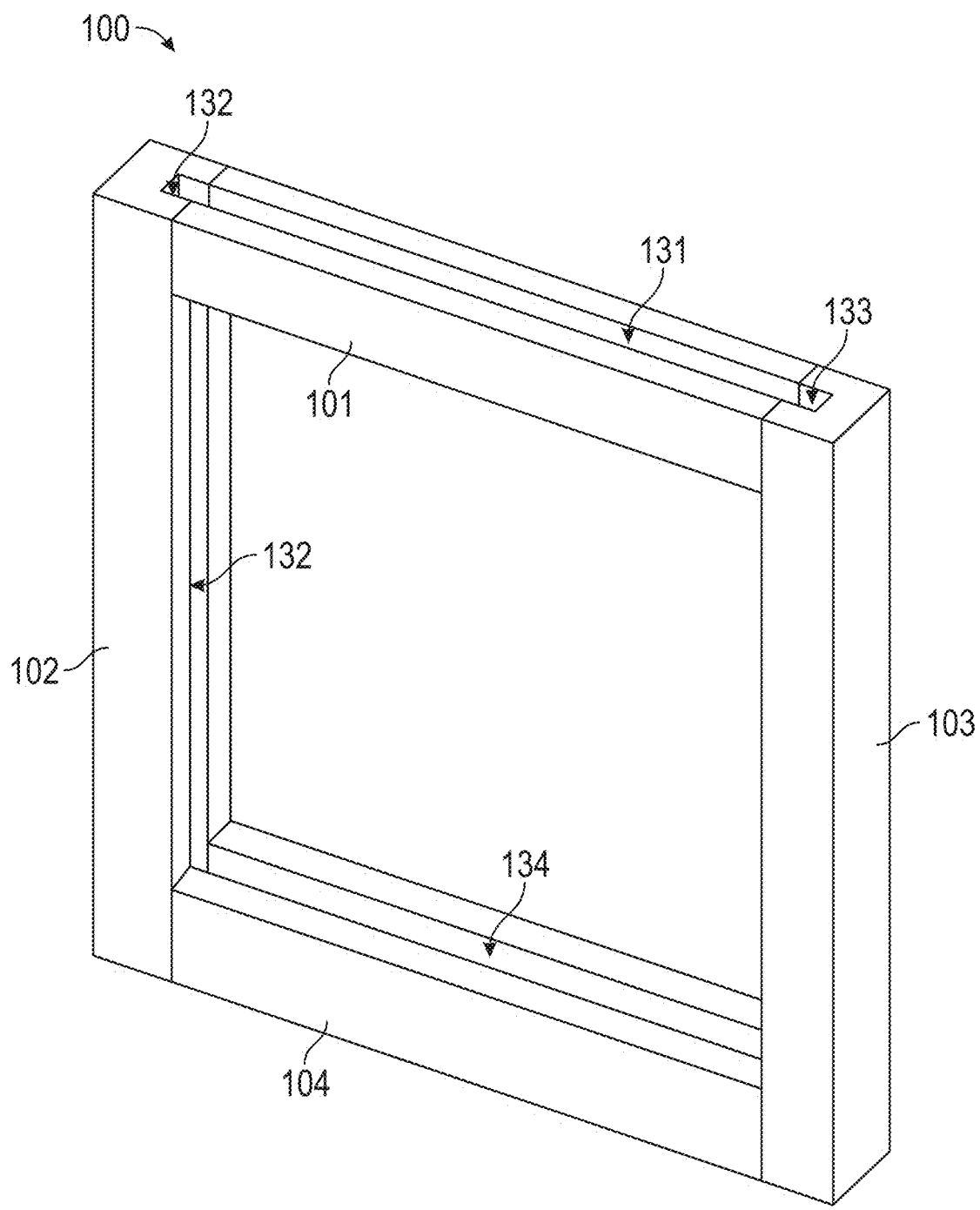
FIG. 8 shows a detailed view of the grooved and slotted portions of a firearm target frame that does not have any angled surfaces, according to some aspects of the present disclosure.

FIGS. 5-7 show the back side of the firearm target frame 100. The back of the firearm target frame 100 includes wings 135, 136 that oppose the second sloped surfaces 112 of the vertically oriented side members 102, 103. The wings 135, 136 are hollow and are sloped outwardly, rearwardly, and toward a periphery of the firearm target frame 100. FIGS. 6-8 also show exit holes 205, showing how projectiles exit at the rear of the shooting target 200 (which in this instance is a used shooting target 200B).

FIGS. 5-7 also emphasize that the slot 131 can be open at one side. In other words, the horizontally oriented top member 101 can comprise just one of the pair of members that make up the horizontally oriented top member 101 that oppose one another. The one of the pair is preferably the front member of said pair.

As shown in FIG. 8, each of the vertically oriented side members 102, 103 have grooves 132, 133 on an internal side of the vertically oriented side members 102, 103. The grooves 132, 133 oppose each other. The horizontally oriented bottom member 104 includes a groove 134 in a top surface thereof. The horizontally oriented top member 101 includes a slot 131 that allows the target 200 to be dropped therethrough and into the grooves 132, 133 until the target 200 rests on top of the horizontally oriented bottom member 104 and/or in the groove 134.

FIG. 8 shows there can exist embodiments of the firearm target frame 100 horizontally oriented top member 101, vertically oriented side members 102, 103, and horizontally oriented bottom member 104 do not have angled surfaces to control ricochets. Such frame(s) could be used, for example, where the risk of the projectile to be used ricocheting is minimal and/or would not cause injury to persons nearby (e.g., the projectile(s) are foam darts).

The mechanism (e.g. grooves) in the firearm target frame 100 for holding the target 200 in place is free from a compression force that establishes a frictional fit. The firearm target frame 100 is also free from fasteners (includes zero fasteners) that can establish direct attachment of the target to said frame. The target 200 is loosely and separably placed into the grooves 132, 133, 134 of the firearm target frame so that it can later be quickly removed therefrom.

Figure 9:
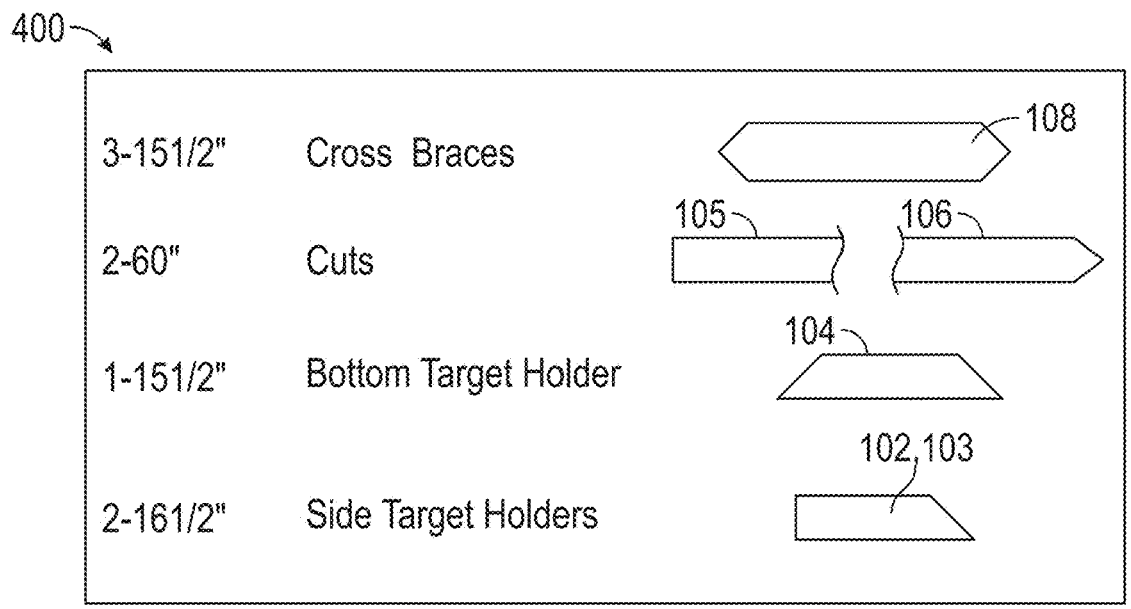
FIG. 9 shows an exploded, component view of the grooved and slotted portion of the firearm target frame of FIG. 2, according to some aspects of the present disclosure.

FIG. 9 shows a kit 400 for components with example dimensions that can be used to assembly one such example of the firearm target frame 100.

Figure 10:
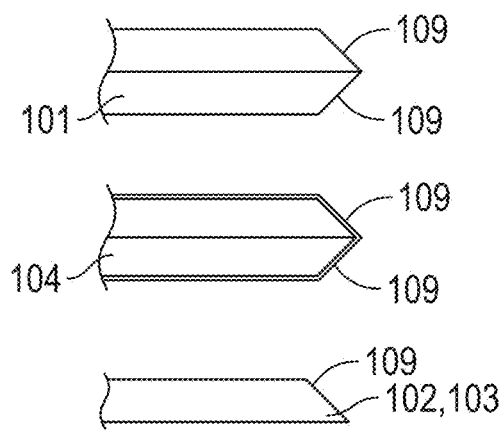
FIG. 10 shows a detailed view of compound cuts that are included in each of the members of the firearm target frame of FIG. 2, according to some aspects of the present disclosure.

As shown in FIG. 10, each of the vertically oriented side members 102, 103 are given 450 cuts at a top end, and the horizontally oriented top member and the horizontally oriented bottom member are each given two 45° cuts at each end.

Figure 11:
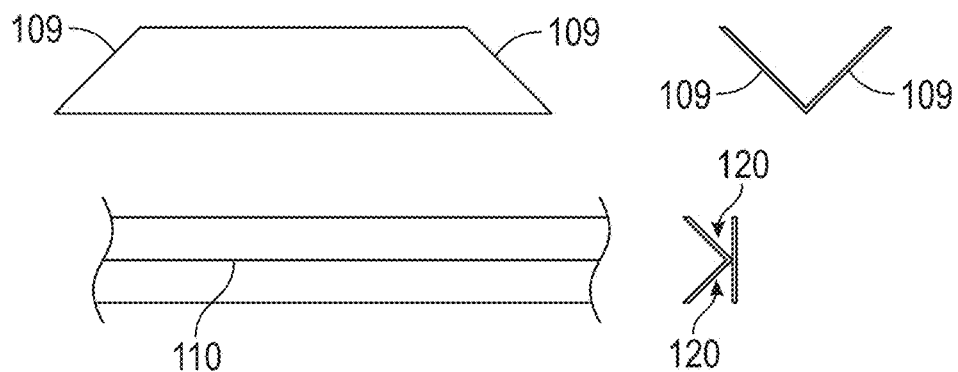
FIG. 11 shows how to utilize a jig to cut each of the members of the firearm target frame of FIG. 2 so that in combination with the compound cuts of FIG. 7 each of the members are able to achieve the configuration that is shown in the firearm target frame of FIG. 2, according to some aspects of the present disclosure.

As shown in FIG. 11, the firearm target frame 100 preferably comprises steel, and even more preferably steel that is amenable to being easily welded together. The vertically oriented side members 102, 103 are welded with welds 120 to the horizontal bottom member 104. One or more cross-braces 108 can be welded with welds 120 to each of the legs 105, 106 and/or vertically oriented side members 102, 103 so that the legs 105, 106 and the vertically oriented side members 102, 103 maintain a constant distance from one another throughout the firearm target frame 100. The 450 cuts at the top end of the vertically oriented side members 102, 103 are welded with welds 120 to the 45° cuts at each end of the horizontal top member 101.

Instead of steel, in some applications the firearm target frame 100 is constructed from wood or plastic, for example where the firearm target frame 100 is already durable enough because of the types of projectiles or weaponry used.

Figure 12:
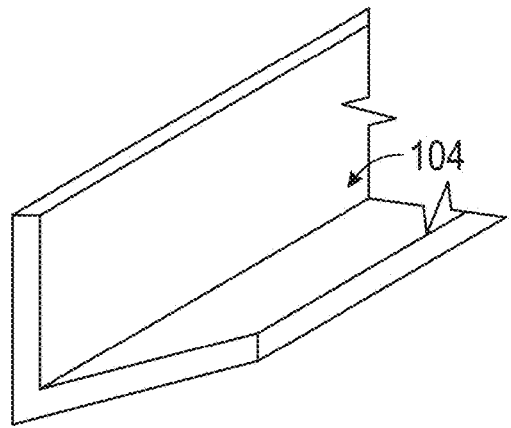
FIG. 12 shows a cross-sectional view of a member that has been cut so as to control the ricochet of bullets that hit the firearm target frame of FIG. 2, according to some aspects of the present disclosure.

As shown in FIG. 12, a hollow cavity 140 can be located behind the central ridge 110. This can allow for some give (i.e. temporarily deforms upon impact) so as to further help control ricochet.

Figure 13:
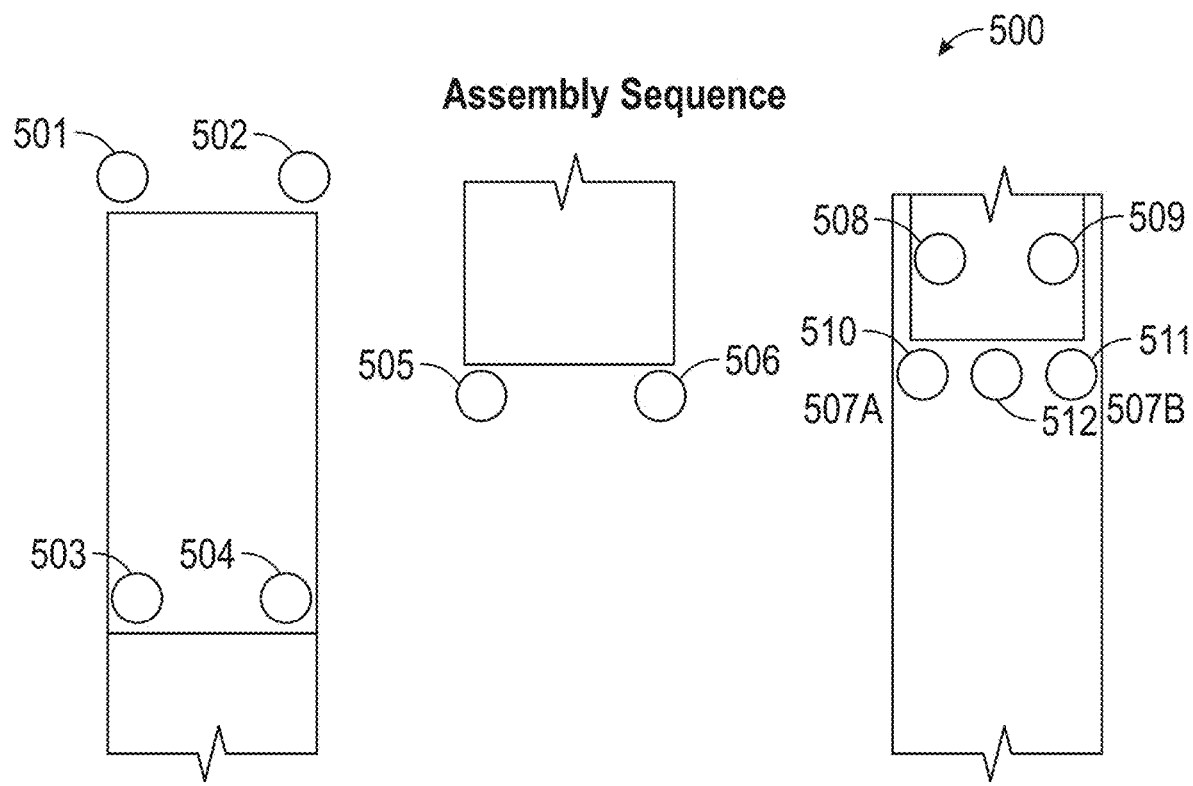
FIG. 13 shows an exemplary assembly sequence for assembling each member into the firearm target frame of FIG. 2, according to some aspects of the present disclosure.

FIG. 13 shows an example assembly sequence 500 for constructing the firearm target frame 100 from kit 400K. The assembly sequence 500 can ideally be carried out by ordinary metalworking tools and techniques found in the home. The assembly sequence 500 comprises making a first weld 501 between a top member 101 and a first leg 105; a second weld 502 between the top member 101 and a second leg 106; a third weld between a support member 107 and the first leg 105; a fourth weld 504 between a support member 107 and the second leg 106; a fifth weld 505 between a first side member 102 and a bottom member 104; a sixth weld 506 between a second side member 103 and the bottom member 104; assembling back pieces 108 into slots 507A & 507B; a seventh weld 508 between the first side member 102 and the back piece 108; an eighth weld 509 between the second side member 103 and the back piece 108; a ninth weld 510 between the bottom member 104 and the first side member 102; a tenth weld 511 between the bottom member 104 and the second side member 103; and an eleventh weld between the back piece 108 and the bottom member 104.

The shooting target 200 is intended to be stationary within the firearm target frame 100, secured without a compression force that establishes a frictional fit. However, it is to be appreciated that if a dynamic target is desired, the entire frame can be mounted to a movable object and the shooting target therefore moved. The movable object could even be controlled by an operator such that it could be moved in a single dimension (e.g., within rails); in two dimensions (e.g. on wheels); or even three dimensions (e.g. attached to a drone).

From the foregoing, it can be seen that the present disclosure accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

| | List of Reference Characters |
|---|---|
| 90 | coroplast board |
| 91 | portable range steel target stand |
| 92 | friction fit |
| 93 | target |
| 94 | stakes |
| 100 | firearm target frame |
| 101 | top member |
| 102 | first side member |
| 103 | second side member |
| 104 | bottom member (first cross brace) |
| 105 | first leg |
| 106 | second leg |
| 107 | support member |
| 108 | cross brace |
| 109 | 45° cuts |
| 110 | ridge |
| 111 | first sloped surface |
| 112 | second sloped surface |
| 120 | weld |
| 131 | slot |
| 132 | first vertical internal groove |
| 133 | second vertical internal groove |
| 134 | optional horizontal internal groove |
| 135 | first wing |
| 136 | second wing |
| 140 | hollow cavity behind member(s) |
| 200 | shooting target |
| 200A | struck/used target |
| 200B | unstruck/new target |
| 201 | regions worth numeric point values |
| 202 | depictions of objects intended to be shot (e.g., a bullseye) |
| 203 | visual markers (cross-hairs) |
| 204 | objects intended not be shot with projectiles (e.g. regions worth no points, depictions of objects considered friendly fire) |
| 205 | exit holes |
| 300 | marksman |
| 301 | hand |
| 302 | upward pushing/slide force |
| 303 | gravitational/dropping force |
| 400A | assembled system for shooting & target practice |
| 400K | kit for assembling firearm target frame |
| 500 | assembly sequence |
| 501 | weld (top member to first leg) |
| 502 | weld (top member to second leg) |
| 503 | weld (first cross brace to first leg) |
| 504 | weld (first cross brace to second leg) |

TABLE 1-continued

List of Reference Characters

| | |
|---|---|
| 505 | weld (first side member to second cross brace) |
| 506 | weld (second side member to second cross brace) |
| 507 | A & B slots for back piece |
| 508 | weld (first side member to back piece) |
| 509 | weld (second side member to back piece) |
| 510 | weld (bottom member to first side) |
| 511 | weld (bottom member to second side) |
| 512 | weld (back piece to bottom member) |

GLOSSARY

Unless defined otherwise, all technical and scientific terms used above have the same meaning as commonly understood by one of ordinary skill in the art to which embodiments of the present disclosure pertain.

The terms "a," "an," and "the" include both singular and plural referents.

The term "or" is synonymous with "and/or" and means any one member or combination of members of a particular list.

As used herein, the term "exemplary" refers to an example, an instance, or an illustration, and does not indicate a most preferred embodiment unless otherwise stated.

The term "about" as used herein refers to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variables, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "invention" is not intended to refer to any single embodiment of the particular invention but encompass all possible embodiments as described in the specification and the claims. The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

What is claimed is:

1. A frame for a target, the frame comprising:
vertically oriented side members, each of the vertically oriented side members having a longitudinal groove on an internal side of the vertically oriented side members, wherein the grooves oppose each other and are dimensioned to receive opposite edges of the target, said target being planar;
a horizontally oriented bottom member; and
a horizontally oriented top member comprising a pair of spaced apart members defining a slot therebetween:
wherein the slot is sized to allow insertion of the target from above by gravity so that the target drops into the grooves until the target rests on top of the horizontally oriented bottom member;
wherein each of the vertically oriented side members, the horizontally oriented bottom member, and the horizontally oriented top member have first and second sloped surfaces that taper rearwardly and away from a central ridge so that projectiles ricochet downrange from (i) a point of impact and (ii) a location at which the projectiles are released;
wherein an upper end of each vertically oriented side member and each end of the horizontally oriented bottom member and the horizontally oriented top member are cut at complementary angles to form mitered joints; and further wherein the side members are fixedly joined to the top and bottom members at said mitered joints, thereby forming a rectangular shape and a rigidness in said frame;
wherein the grooves for holding the target in place is free from a compression force or clamping that establishes a frictional fit of the target within the frame; and
wherein the frame is free from fasteners or locking mechanisms that directly attach to the target to retain the target.

2. The frame of claim 1, wherein the horizontally oriented bottom member includes a groove in a top surface thereof.

3. The frame of claim 1, wherein the horizontally oriented top member comprises a pair of members opposed to one another with a slot therethrough, wherein the slot allows the target to be dropped into the grooves until the target rests on top of the horizontally oriented bottom member.

4. The frame of claim 1, wherein the target comprises paper, paperboard, or cardboard.

5. The frame of claim 1, wherein the frame hangs from a ceiling or is bolted to the ground.

6. The frame of claim 1, wherein the frame comprises aluminum.

7. The frame of claim 1, wherein the frame comprises steel.

8. The frame of claim 1, wherein the frame comprises wood.

9. The frame of claim 1, wherein the vertically oriented side members are welded to the horizontally oriented bottom member and the horizontally oriented top member.

10. The frame of claim 1, further comprising legs that extend downwardly from each end of the horizontally oriented bottom member.

11. The frame of claim 10, further comprising a crossbrace welded to each of the legs so that the legs maintain a constant distance from one another from the top of the legs to the bottom of the legs.

12. The frame of claim 1, wherein an angle of the taper is 30°, between 30° and 60°, or 60°.

13. The frame of claim 1, wherein a hollow cavity is located behind the central ridge.

14. The frame of claim 1, wherein each of the vertically oriented side members are given 45° cuts at a top end.

15. The frame of claim 14, wherein the horizontally oriented top member and the horizontally oriented bottom member are each given two 45° cuts at each end.

16. The frame of claim 15, wherein the 45° cuts at the top end of the vertically oriented side members are welded to the 45° cuts at each end of the horizontally oriented top member and the horizontally oriented bottom member.

17. A kit comprising:
vertically oriented side members, each of the vertically oriented side members having a longitudinal groove on an internal side of the vertically oriented side members and are dimensioned to receive opposite edges of a planar target, wherein the vertically oriented side members each comprise sloped surfaces that are joined at a central ridge and are that tapered rearwardly and away from a central ridge so that projectiles ricochet downrange from (i) a point of impact and (ii) a location at which the projectiles are released;
a horizontally oriented bottom member comprising sloped surfaces that are joined at a central ridge, wherein the horizontally oriented bottom member has a groove in an upper surface for supporting a lower edge of the planar target; and
a horizontally oriented top member comprising (i) a pair of spaced apart members defining a slot therethrough, wherein the slot allows the planar target to be dropped therethrough from above by gravity so that the planar target drops into the grooves until the planar target rests on top of the horizontally oriented bottom member; and (ii) sloped surfaces that are joined at a central ridge;
wherein each of the side members, the bottom member, and the top member has mitered end surfaces configured for mating engagement with one another in the assembled frame; and
zero fasteners for establishing direct attachment of the planar target to any one or more of the vertically oriented side members, the horizontally oriented bottom member, and the horizontally oriented top member, and further wherein the planar target being held in place by the grooves of the assembled frame without any clamps, pins, or external retention devices.

* * * * *